(12) United States Patent
Harada et al.

(10) Patent No.: US 9,816,445 B2
(45) Date of Patent: Nov. 14, 2017

(54) DEVICE FOR CONTROLLING DIRECT-INJECTION GASOLINE ENGINE

(71) Applicant: MAZDA MOTOR CORPORATION, Hiroshima (JP)

(72) Inventors: Yuji Harada, Higashihiroshima (JP); Hiroyuki Yamashita, Hiroshima (JP); Tatsuya Tanaka, Higashihiroshima (JP); Tsugio Fukube, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/119,594

(22) PCT Filed: Mar. 2, 2015

(86) PCT No.: PCT/JP2015/001079
§ 371 (c)(1),
(2) Date: Aug. 17, 2016

(87) PCT Pub. No.: WO2015/129285
PCT Pub. Date: Sep. 3, 2015

(65) Prior Publication Data
US 2017/0058793 A1 Mar. 2, 2017

(30) Foreign Application Priority Data

Feb. 28, 2014 (JP) .................. 2014-038945

(51) Int. Cl.
*F02D 35/02* (2006.01)
*F02D 41/20* (2006.01)
(Continued)

(52) U.S. Cl.
CPC ....... *F02D 35/024* (2013.01); *F02D 41/2096* (2013.01); *F02D 41/3023* (2013.01);
(Continued)

(58) Field of Classification Search
CPC .... F02D 35/024; F02D 41/2096; F02D 41/38; F02D 41/401; F02D 41/402; F02M 45/12; F02M 51/0603
(Continued)

(56) References Cited

U.S. PATENT DOCUMENTS 5,467,757 A * 11/1995 Yanagihara ............... F02B 1/12
123/27 R
5,626,115 A 5/1997 Kawaguchi
(Continued)

FOREIGN PATENT DOCUMENTS

EP 2 522 841 A1 11/2012
JP H08-246936 A 9/1996
(Continued)

OTHER PUBLICATIONS

International Search Report issued in PCT/JP2015/001079; dated Mar. 24, 2015.
(Continued)

*Primary Examiner* — Mahmoud Gimie
(74) *Attorney, Agent, or Firm* — Studebaker & Brackett PC

(57) ABSTRACT

An engine (1) includes an engine body, an injector (33), and an engine controller (100). The engine body includes a piston (15) inside a cylinder (11), and a combustion chamber (17) defined by the cylinder (11) and the piston (15). The injector (33) injects fuel containing at least gasoline into the combustion chamber (17) via a nozzle port (41). The engine controller (100) allows the injector (33) to inject the fuel in at least a second half of a compression stroke, and controls an injection condition of the injector (33). The injector (33) has a parameter for adjusting spread of fuel spray. The
(Continued)

engine controller (100) adjusts the parameter to increase the spread of fuel spray with an increase in pressure in the combustion chamber (17).

15 Claims, 13 Drawing Sheets

(51) Int. Cl.
| | | |
|---|---|---|
| *F02M 61/18* | (2006.01) | |
| *F02D 41/30* | (2006.01) | |
| *F02D 41/38* | (2006.01) | |
| *F02D 41/40* | (2006.01) | |
| *F02M 45/12* | (2006.01) | |
| *F02M 51/06* | (2006.01) | |
| *F02M 61/08* | (2006.01) | |
| *F02B 23/10* | (2006.01) | |
| *F02B 23/06* | (2006.01) | |

(52) U.S. Cl.
CPC ............ *F02D 41/38* (2013.01); *F02D 41/401* (2013.01); *F02D 41/402* (2013.01); *F02M 45/12* (2013.01); *F02M 51/0603* (2013.01); *F02M 61/08* (2013.01); *F02M 61/1806* (2013.01); *F02B 23/0603* (2013.01); *F02B 23/10* (2013.01); *F02D 2041/389* (2013.01); *F02D 2250/11* (2013.01); *Y02T 10/44* (2013.01)

(58) Field of Classification Search
USPC ........................................ 123/478, 490, 498
See application file for complete search history.

(56) References Cited

U.S. PATENT DOCUMENTS

| | | |
|---|---|---|
| 7,168,412 B2 | 1/2007 | Cooke et al. |
| 2008/0099585 A1 | 5/2008 | Ohata et al. |
| 2011/0155105 A1 | 6/2011 | Sukegawa et al. |
| 2014/0001290 A1* | 1/2014 | Nishida .................. F02M 61/10 239/585.1 |

FOREIGN PATENT DOCUMENTS

| | | |
|---|---|---|
| JP | H11-101127 A | 4/1999 |
| JP | H11-200865 A | 7/1999 |
| JP | 2006-052665 A | 2/2006 |
| JP | 2007-192233 A | 8/2007 |
| JP | 2008-151043 A | 7/2008 |
| JP | 4194564 B2 | 12/2008 |
| JP | 2010-077825 A | 4/2010 |
| JP | 2011-132849 A | 7/2011 |
| JP | 2013-057266 A | 3/2013 |
| WO | 2012/105038 A1 | 8/2012 |

OTHER PUBLICATIONS

Written Opinion issued in PCT/JP2015/001079; dated Mar. 24, 2015.
International Preliminary Report on Patentability issued in PCT/JP2015/001079; dated Feb. 16, 2016.

* cited by examiner

INJECTION INTERVAL: LONG

NEGATIVE PRESSURE REGION

INJECTION INTERVAL: SHORT

NEGATIVE PRESSURE REGION

DEVICE FOR CONTROLLING DIRECT-INJECTION GASOLINE ENGINE

TECHNICAL FIELD

The present disclosure relates to a device for controlling a direct-injection gasoline engine.

BACKGROUND ART

Conventionally, techniques of controlling the concentration distribution or form of an air-fuel mixture in a combustion chamber have been known. For example, an engine according to Patent Document 1 performs first fuel injection in an intake or compression stroke to form a lean mixture in a combustion chamber, and then performs second fuel injection in the compression stroke to form a rich mixture, thereby reducing soot in the combustion chamber.

Patent Document 2 shows an outward opening valve type injector that injects fuel into the combustion chamber of an engine. In an outward opening valve type injector, the lift amount of a valve body is changed to change the effective cross-sectional area of a nozzle port injecting the fuel. Patent Document 3 shows a valve covered orifice (VCO) type injector. In a VCO type injector, a needle valve is set directly on a seat, to which a nozzle port is open, to close the nozzle port. In accordance with the lift amount of the needle valve, the size of the cavitation area on the inner peripheral surface of the nozzle port changes. As a result, the effective cross-sectional area of the nozzle port changes in accordance with the lift amount of the needle valve in a VCO-type injector, as in an outward opening valve type injector.

Patent Document 4 shows an engine including an outward opening valve type injector, which is located on the central axis of a cylinder and injects fuel in a cone shape. The fuel is injected into the cylinder at a terminal stage of a compression stroke to form a mixture layer in a combustion chamber and a gas layer (i.e., a gas layer containing fresh air) around the mixture layer. In the engine shown in Patent Document 4, at the combustion of an air-fuel mixture for forming the mixture layer, the surrounding gas layer functions as a heat insulating layer to reduce cooling loss.

CITATION LIST

Patent Document

[PATENT DOCUMENT 1] Japanese Unexamined Patent Publication No. H11-101127
[PATENT DOCUMENT 2] Japanese Unexamined Patent Publication No. 2008-151043
[PATENT DOCUMENT 3] Japanese Patent No. 4194564
[PATENT DOCUMENT 4] Japanese Unexamined Patent Publication No. 2013-57266

SUMMARY OF THE INVENTION

Technical Problem

Fuel spray injected into a combustion chamber is influenced by the environment in the combustion chamber. Specifically, even if fuel is injected under the same injection condition, the concentration distribution and form of an air-fuel mixture formed in the combustion chamber, for example, are different depending on the environment in the combustion chamber.

The present disclosure is made in view of the problem. It is an object of the present disclosure to reduce a change in an air-fuel mixture caused by a change in the environment in the combustion chamber.

Solution to the Problem

The present disclosure provides a device for controlling a direct-injection gasoline engine. The device includes an engine body including a piston inside a cylinder, and a combustion chamber defined by the cylinder and the piston; an injector injecting fuel containing at least gasoline into the combustion chamber via an injection port; and a controller allowing the injector to inject the fuel in at least a second half of a compression stroke, and controlling an injection condition of the injector. The injector has a parameter for adjusting spread of fuel spray. The controller predicts pressure in the combustion chamber. The controller adjusts the parameter so that the spread of fuel spray is greater when the predicted pressure is high than that when the predicted pressure is low, even if a same amount of fuel is injected.

The controller may adjust the parameter so that the spread of fuel spray increases with an increase in the predicted pressure, even if the same amount of fuel is injected.

The "second half of the compression stroke" here means the second half when the compression stroke is divided into two of first and second halves.

If the fuel is injected with a constant parameter, the higher the in-cylinder pressure is, the less the fuel spray spreads. Specifically, the higher the in-cylinder pressure is, the less the spray of a formed air-fuel mixture spreads. By contrast, in the injector described above, the parameter is adjusted to adjust the spread of fuel spray. The parameter for adjusting the spread of fuel spray is, for example, an effective cross-sectional area of the injection port, or an injection interval in multi-stage injection. The parameter is adjusted so that the spread of fuel spray increases with an increase in the in-cylinder pressure. This reduces a decrease in the fuel spray that is caused by a rise in the in-cylinder pressure. That is, a desired air-fuel mixture is easily formed while eliminating the influence of a change in the in-cylinder pressure as much as possible.

The parameter may be an effective cross-sectional area of the injection port. The controller may control the effective cross-sectional area of the injection port to be larger when the predicted pressure is high than that when the predicted pressure is low, even if the same amount of fuel is injected.

The adjustment of the effective cross-sectional area of the injection port adjusts the spread of fuel spray. Specifically, a change in the effective cross-sectional area of the injection port changes the particle size of the fuel spray injected from the injection port. The change in the particle size of the fuel spray changes the momentum of the fuel spray. The change in the momentum of the fuel spray changes the spray distance of the fuel spray thereby changing the spread of fuel spray. Specifically, the larger the effective cross-sectional area of the injection port is, the greater the particle size of the fuel spray is and the more the fuel spray spreads.

The parameter may be an injection interval in multi-stage injection. The controller may allow the injector to perform the multi-stage injection in at least the second half of the compression stroke. The controller may control the injection interval to be longer when the predicted pressure is high than that when the predicted pressure is low, even if the same amount of fuel is injected.

In the multi-stage injection, multiple times of fuel injection are intermittently performed. The adjustment of the injection interval at that time also adjusts the spread of fuel spray. Specifically, when the fuel is injected, the Coanda effect generates a negative pressure region near the central axis of the fuel injection. The size of the negative pressure region changes in accordance with the length of injection interval. Specifically, a long injection interval would recover the pressure in the negative pressure region by the next fuel injection, and thus reduces the size of the negative pressure region. Where the negative pressure region is small, the fuel spray is less drawn by the negative pressure and disperses easily. On the other hand, at a short injection interval, the fuel is injected one after another to maintain the negative pressure in the negative pressure region, thereby increasing the size of the negative pressure region. Where the negative pressure region is large, the fuel spray is drawn by the negative pressure to spread less. That is, the longer the injection interval is, the more the fuel spray spreads, and the shorter the injection interval is, the less the fuel spray spreads.

The effective cross-sectional area of the injection port influences the susceptibility of the fuel spray from the negative pressure region. A small effective cross-sectional area of the injection port reduces the particle size of the fuel spray, and thus the fuel spray is easily influenced by the negative pressure region. Specifically, small particle fuel spray is likely to be drawn by the negative pressure region and the speed of the fuel spray decreases due to the negative pressure region. Therefore, a reduction in the effective cross-sectional area of the injection port reduces the spread of fuel spray.

In this manner, the adjustment of at least one of the effective cross-sectional area of the injection port and the injection interval in accordance with the in-cylinder pressure adjusts the spread of fuel spray in accordance with the in-cylinder pressure.

Furthermore, the parameter may be an effective cross-sectional area of the injection port and an injection interval in multi-stage injection. The controller may allow the injector to perform the multi-stage injection in at least the second half of the compression stroke. The controller may control the effective cross-sectional area of the injection port to be larger and the injection interval to be longer when the predicted pressure is high than that when the predicted pressure is low, even if the same amount of fuel is injected.

As described above, the larger the effective cross-sectional area of the injection port is, the more the fuel spray spreads. The longer the injection interval is, the more the fuel spray spreads. Thus, an increase in the effective cross-sectional area of the injection port and/or in the injection interval with an increase in the in-cylinder pressure reduces a decrease in the fuel spray that is caused by a rise in the in-cylinder pressure. This results in reduction in, for example, a change in the concentration distribution and form of an air-fuel mixture that is caused by a change in the in-cylinder pressure.

The injector may include a nozzle body with the injection port, and a valve body opening and closing the injection port. The effective cross-sectional area of the injection port may change in accordance with a lift amount of the valve body. The effective cross-sectional area of the injection port may increase with an increase in the lift amount of the valve body.

In the injector described above, adjustment of the lift amount of the valve body adjusts the effective cross-sectional area of the injection port, and eventually changes the particle size of the fuel spray.

The present disclosure also provides a device for controlling a direct-injection gasoline engine. The device includes an engine body including a piston inside a cylinder, and a combustion chamber defined by the cylinder and the piston; an injector injecting fuel containing at least gasoline into the combustion chamber via an injection port; and a controller allowing the injector to inject the fuel in at least a second half of a compression stroke, and controlling an injection condition of the injector. The injector has a parameter for adjusting spread of fuel spray. The controller adjusts the parameter so that the earlier in the second half of the compression stroke the fuel is injected from the injector, the less the fuel spray spreads.

The in-cylinder pressure largely depends on the time of fuel injection in the second half of the compression stroke. Even if almost the same amount of fuel is injected at the same engine load, the fuel injection tends to start earlier at a high engine speed, for example, to ensure the time for gasifying the fuel (i.e., delay in ignition). Thus, at the start of fuel injection, the in-cylinder pressure is low and the fuel spray spreads easily.

The adjustment of the parameter for adjusting the spread of fuel spray so that the earlier the injector injects the fuel, the less the fuel spray spreads provides uniform spread of fuel spray at any time, even if the same amount of intake air fills the cylinder.

This uniform spread of fuel spray forms a gas layer (a heat insulating gas layer in combustion) of fresh air and/or burnt gas, for example, between the wall surface of the combustion chamber and a mixture layer.

The parameter may be an effective cross-sectional area of the injection port. The controller may control the effective cross-sectional area of the injection port to be smaller where the fuel is injected earlier in the second half of the compression stroke than where the fuel is injected later.

The controller may allow the injector to inject the fuel in the second half of the compression stroke to form a gas layer of fresh air and/or burnt gas between a mixture layer and a wall surface which defines the combustion chamber at ignition of the air-fuel mixture of the mixture layer.

According to this structure, at combustion of the air-fuel mixture forming the mixture layer, the gas layer surrounding the mixture layer functions as a heat insulating layer between the mixture layer and the wall surface defining the combustion chamber to largely reduce cooling loss.

The gas layer contains substantially no fuel (e.g., with an equivalence ratio φ of 0.1 or lower) but contains fresh air and/or exhaust gas.

The wall surface of the combustion chamber may be an inner peripheral surface of a recessed cavity formed in a crown surface of the piston.

According to this structure, the fuel spray injected from the injector forms the mixture layer in the recessed cavity with a large volume, the gas layer is reliably formed between the inner wall of the cavity and the mixture layer to largely reduce cooling loss.

Advantages of the Invention

The structure described above reduces a change in an air-fuel mixture that is caused by a change in the environment in the combustion chamber.

DESCRIPTION OF EMBODIMENTS

Exemplary embodiments will now be described with reference to the drawings.

Figure 1:
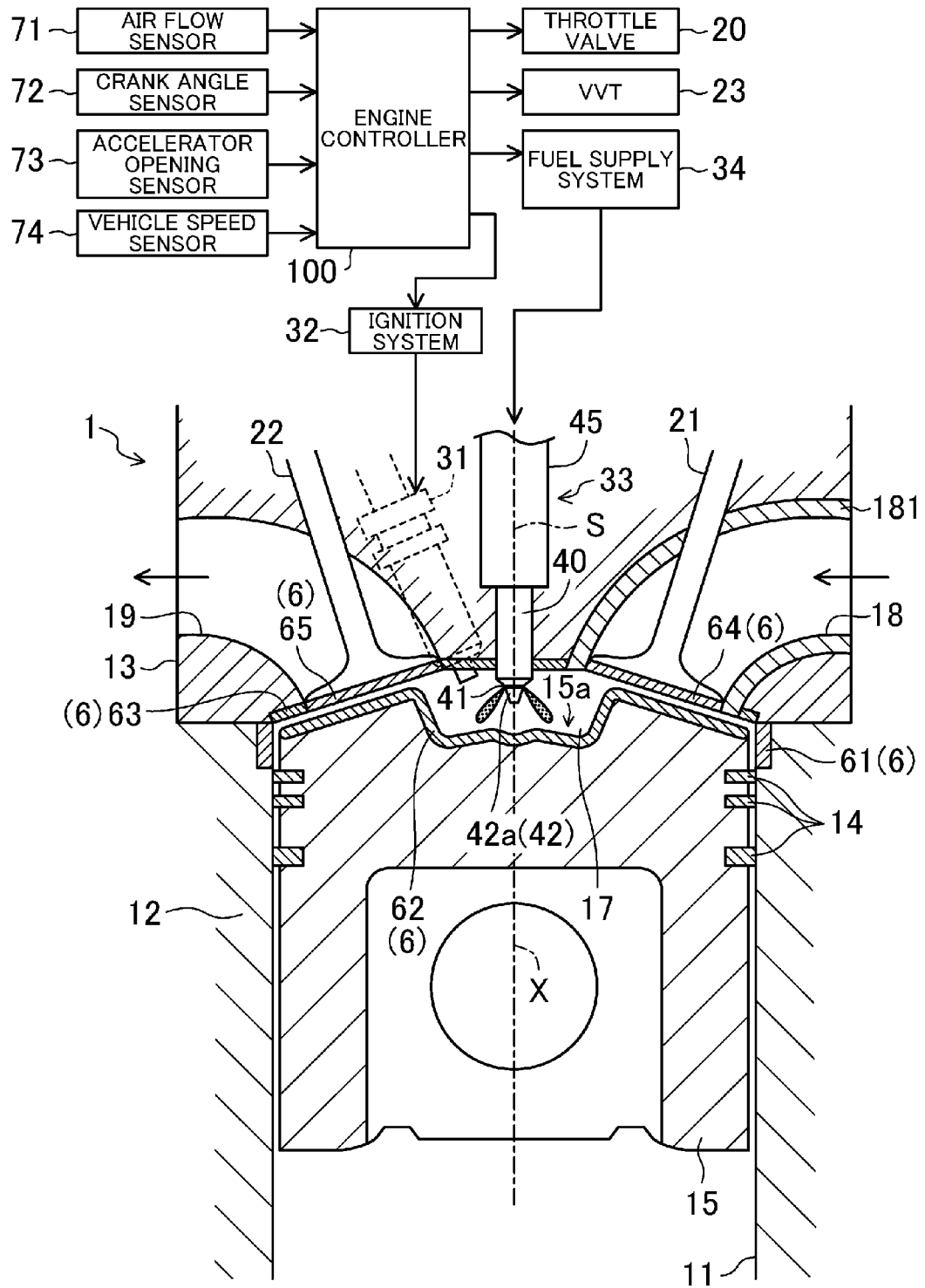
FIG. 1 generally illustrates the structure of a direct-injection gasoline engine.

FIG. 1 generally illustrates a direct injection gasoline engine 1 (hereinafter simply referred to as an engine 1). The engine 1 includes various actuators associated with an engine body, various sensors, and an engine controller 100 controlling the actuators based on signals from the sensors.

The engine 1 is mounted in a vehicle such as an automobile. Although not shown, the output shaft of the engine 1 is connected to drive wheels via a transmission. An output of the engine 1 is transmitted to the drive wheels so that the vehicle moves forward. The engine body of the engine 1 includes a cylinder block 12, and a cylinder head 13 mounted on the cylinder block 12. A plurality of cylinders 11 (only one is shown in FIG. 1) are formed inside the cylinder block 12. Although not shown, a water jacket, in which cooling water flows, is formed inside the cylinder block 12 and the cylinder head 13.

While in this embodiment, an example has been described where the fuel of the engine 1 is gasoline, the gasoline may contain bioethanol, for example. Any fuel may be used, as long as it is liquid fuel containing at least gasoline.

A piston 15 is slidably inserted in each of the cylinders 11. The piston 15 defines a combustion chamber 17 together with the cylinder 11 and the cylinder head 13. In the example figure, the combustion chamber 17 is of what is called a pent roof type. The ceiling surface (i.e., the lower surface of the cylinder head 13) is like a triangle roof including two inclined surfaces at the intake side and the exhaust side. The crown surface of the piston 15 is in a raised form corresponding to the ceiling surface. A recessed cavity (recess) 15a is formed in the center of the crown surface. Note that the ceiling surface and the crown surface of the piston 15 may be in any form, as long as a high geometric compression ratio described below can be provided. For example, both of the ceiling surface and the crown surface of the piston 15 (i.e., the portion except for the cavity 15a) may be planes perpendicular to the central axis of the cylinder 11. While the ceiling surface may form the triangular roof as described above, the top crown of the piston 15 (i.e., the portion except for the cavity 15a) may be a plane perpendicular to the central axis of the cylinder 11.

Although FIG. 1 shows only one, two intake ports 18 are formed at the cylinder head 13 in each cylinder 11. Each of the intake ports 18 is open at the lower surface of the cylinder head 13 (i.e., at the inclined portion of the ceiling surface of the combustion chamber 17 at the intake side) to communicate with the combustion chamber 17. Similarly, two exhaust ports 19 are formed at the cylinder head 13 in each cylinder 11. Each of the exhaust ports 19 is open at the lower surface of the cylinder head 13 (i.e., at the inclined portion of the ceiling surface of the combustion chamber 17 at the exhaust side) to communicate with the combustion chamber 17. Each intake port 18 is connected to an intake passage (not shown), through which fresh air flows into the associated one of the cylinders 11. The intake passage is provided with a throttle valve 20 which controls an intake flow rate. The opening degree of the throttle valve 20 is controlled in response to a control signal from the engine controller 100. On the other hand, each exhaust port 19 is connected to an exhaust passage (not shown), through which burnt gas (i.e., exhaust gas) flows from the associated one of the cylinders 11. Although not shown, the exhaust passage is provided with an exhaust gas purifying system including one or more catalyst converter(s). The catalyst converter contains a three-way catalyst.

The cylinder head 13 is provided with an intake valve 21 and an exhaust valve 22 to shut off the intake ports 18 and the exhaust ports 19, respectively, from the combustion chamber 17. The intake valve 21 is driven by an intake valve drive mechanism. The exhaust valve 22 is driven by an exhaust valve drive mechanism. The intake valve 21 and the exhaust valve 22 reciprocate at predetermined timing to open and close the intake ports 18 and the exhaust ports 19, respectively, thereby exchanging gas in the cylinder 11. Although not shown, the intake valve drive mechanism and the exhaust valve drive mechanism include an intake camshaft and an exhaust camshaft, respectively, which are drive-connected to a crankshaft. These camshafts rotate in synchronization with the rotation of the crankshaft. At least the intake valve drive mechanism includes a hydraulic, electric, or mechanical variable valve timing (VVT) mechanism 23 capable of continuously changing the phase of the intake camshaft within a predetermined angle range. A continuous variable valve lift (CVVL) mechanism capable of continuously changing the valve lift amount may be included together with the VVT mechanism 23.

The cylinder head 13 is provided with a spark plug 31. This spark plug 31 is fixed to the cylinder head 13 via a known structure such as screws. In the example figure, the spark plug 31 is fixed to the central axis of the cylinder 11 to be inclined to the exhaust side. The tip portion of the spark plug 31 faces the ceiling portion of the combustion chamber 17. The tip portion of the spark plug 31 is located near a nozzle port 41 of an injector 33, which will be described later. The location of the spark plug 31 is not limited thereto. In this embodiment, the spark plug 31 is of a plasma ignition type, and an ignition system 32 includes a plasma generation circuit. The spark plug 31 allows the ignition system 32 to discharge electricity to generate plasma. The plasma is injected as jet into the cylinder from the tip of the spark plug 31, thereby igniting fuel. The ignition system 32 receives a control signal from the engine controller 100, and allows electrical conduction to the spark plug 31 so that the spark plug 31 generates plasma at desired ignition timing. The spark plug 31 is not limited to the plasma ignition type, and may be of a commonly used spark ignition type.

Along the central axis of the cylinder 11, the cylinder head 13 is provided with the injector 33 directly injecting the fuel into the cylinder (i.e., the combustion chamber 17). The injector 33 is fixed to the cylinder head 13 by a known structure such as brackets. The tip of the injector 33 faces to the center of the ceiling portion of the combustion chamber 17.

Figure 2:
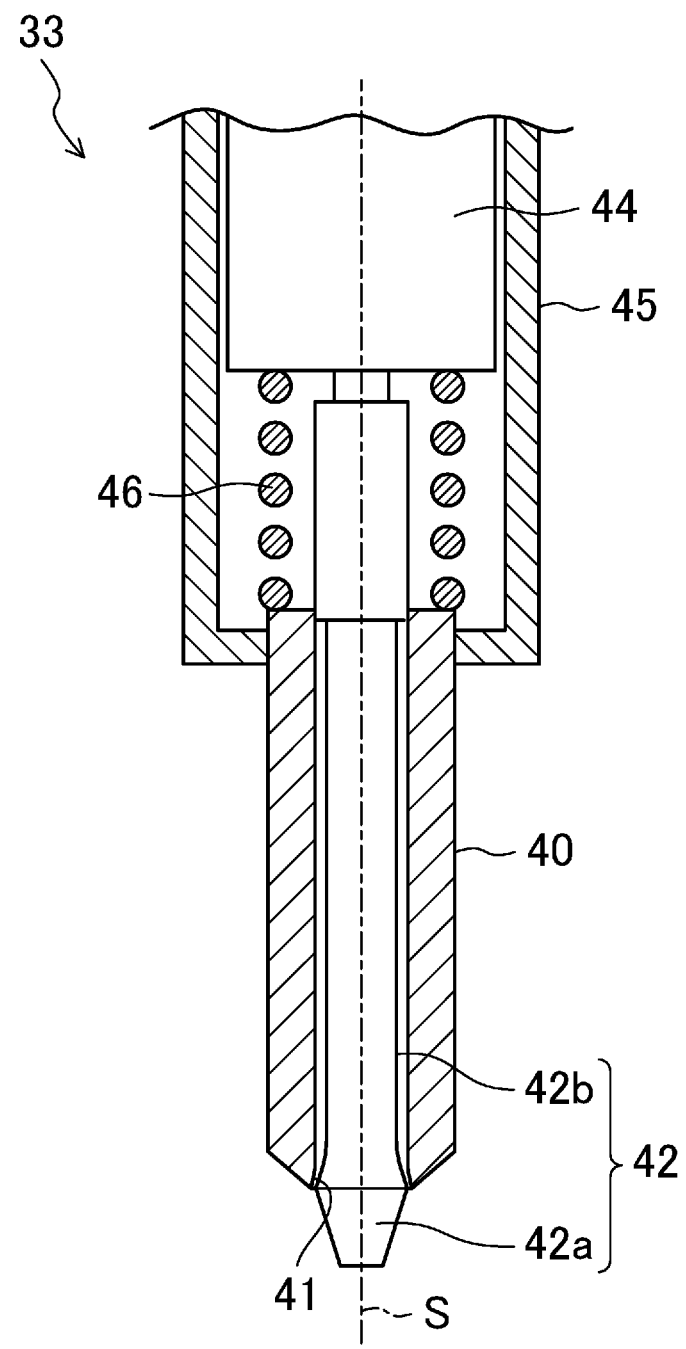
FIG. 2 is a cross-sectional view illustrating the internal structure of an injector.

As shown in FIG. 2, the injector 33 is of an outward opening valve type including a nozzle body 40, and an outward opening valve 42. The nozzle body 40 has a nozzle port 41 for injecting the fuel into the cylinder 11. The outward opening valve 42 opens and closes the nozzle port 41. The injector 33 injects the fuel in the direction inclined relative to a predetermined central axis S so that the fuel spreads outward in the radial direction from the central axis S, and adjusts the effective cross-sectional area of the nozzle port 41. The nozzle port 41 is a mere example of an injection port, and the outward opening valve 42 is a mere example of a valve body.

The nozzle body 40 is a tubular member extending along the central axis S. The fuel flows inside the nozzle body 40. The opening edge of the nozzle port 41 is an inverse taper shape, in which the diameter gradually increases toward the tip, at the tip of the nozzle body 40. The end of the base of the nozzle body 40 is connected to a case 45 provided with a piezoelectric element 44 inside. The outward opening valve 42 includes a valve body 42a, and a connecting portion 42b extending from the valve body 42a to be connected to the piezoelectric element 44 through the nozzle body 40. The valve body 42a is exposed outward from the nozzle body 40 at the tip of the nozzle body 40. The portion of the valve body 42a at the connecting portion 42b has substantially the same shape as the opening edge of the nozzle port 41. When this portion abuts on (i.e., is set on) the opening edge of the nozzle port 41, the nozzle port 41 is closed.

The injector 33 is located such that the central axis S agrees with the central axis X of the cylinder 11 and the nozzle port 41 faces the ceiling portion of the combustion chamber 17.

The piezoelectric element 44 is deformed by voltage application to press the outward opening valve 42 along the central axis of the cylinder 11, thereby lifting up the outward opening valve 42 from the opening edge of the nozzle port 41 of the nozzle body 40. This opens the nozzle port 41. At this time, the fuel is injected from the nozzle port 41 in the direction inclined relative to the central axis S to spread in the radial direction around the central axis S. Specifically, the fuel is injected in the form of a cone (specifically a hollow cone) around the central axis S. In this embodiment, the taper angle of the cone falls within a range from 90° to 100°. The taper angle of the hollow portion inside the hollow cone is about 70°. When the voltage application to the piezoelectric element 44 stops, the piezoelectric element 44 returns to the original shape so that the outward opening valve 42 closes the nozzle port 41 again. At this time, a compression coil spring 46 provided around the connecting portion 42b inside the case 45 assists the piezoelectric element 44 to return.

Figure 7:
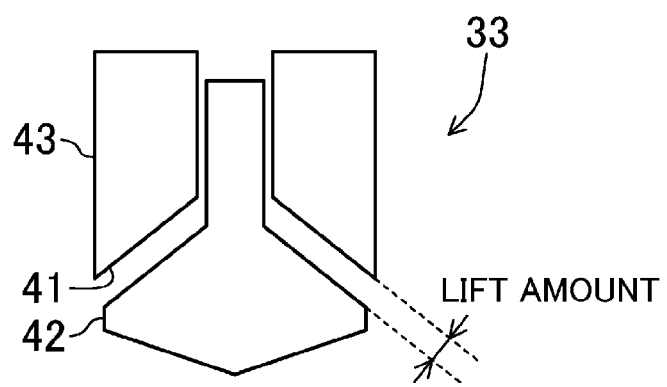
FIG. 7 illustrates the lift amount of an outward opening valve type injector.

As the voltage applied to the piezoelectric element 44 increases, the lift amount of the outward opening valve 42 from the position closing the nozzle port 41 (hereinafter simply referred to as a lift amount) increases (see also FIG. 7). With an increase in the lift amount, the opening degree (i.e., the effective cross-sectional area) of the nozzle port 41 increases to increase the particles size of the fuel spray injected from the nozzle port 41. On the other hand, with a decrease in the lift amount, the opening degree of the nozzle port 41 decreases to reduce the particles size of the fuel spray injected from the nozzle port 41. The piezoelectric element 44 responses quickly to perform multi-stage injection of 20 times, for example, in a cycle. The means for driving the outward opening valve 42 is not limited to the piezoelectric element 44.

A fuel supply system 34 includes an electrical circuit and a fuel supply section. The electrical circuit drives the outward opening valve 42 (i.e., the piezoelectric element 44). The fuel supply section supplies the fuel to the injector 33. The engine controller 100 outputs an injection signal having a voltage corresponding to the lift amount to the electrical circuit at predetermined timing, thereby operating the piezoelectric element 44 and the outward opening valve 42 via the electrical circuit. Then, a desired amount of the fuel is injected into the cylinder. When the injection signal is not output (i.e., when the injection signal has a voltage of zero), the nozzle port 41 is closed by the outward opening valve 42. As such, the operation of the piezoelectric element 44 is controlled by the injection signal from the engine controller 100. The engine controller 100 controls the operation of the piezoelectric element 44, thereby controlling the fuel injection from the nozzle port 41 of the injector 33, and the lift amount in the fuel injection.

Although not shown, the fuel supply section is provided with a high-pressure fuel pump and a common rail. The high-pressure fuel pump feeds the fuel supplied from the fuel tank to the common rail via a low-pressure fuel pump using pressure. The common rail stores the fed fuel by a predetermined pressure. Then, the injector 33 operates (i.e., the outward opening valve 42 is lifted), thereby injecting the fuel stored in the common rail from the nozzle port 41.

The engine controller 100 is a controller including a known microcomputer as a basis. That is, the engine controller 100 includes a central processing unit (CPU), a memory, and an input and output (I/O) bus. The CPU executes programs. The memory includes a RAM and a ROM, for example, and stores programs and data. The I/O bus inputs and outputs electrical signals. The engine controller 100 is an example of a controller.

The engine controller 100 receives at least a signal from an air flow sensor 71, which indicates the intake flow rate, a crank angle pulse signal from a crank angle sensor 72, an accelerator opening signal from an accelerator opening sensor 73, which detects the stepped amount of the accelerator pedal, and a vehicle speed signal from a vehicle speed sensor 74. Based on these input signals, the engine controller 100 calculates parameters for controlling the engine 1 such as a desired throttle opening signal, a fuel injection pulse, an ignition signal, and a valve phase angle signal. Then, the engine controller 100 outputs the signals to the throttle valve 20 (specifically, a throttle actuator operating the throttle valve 20), the fuel supply system 34 (specifically, the electrical circuit), the ignition system 32, the VVT mechanism 23, for example.

Although not shown, this engine 1 includes an EGR system including an EGR passage that connects an exhaust passage to an intake passage and recirculating part of the exhaust gas to the intake passage. The engine controller 100 adjusts the amount of recirculation of the exhaust gas via the EGR system in accordance with the operational state of the engine 1.

The engine 1 has a geometric compression ratio $\epsilon$ falling within a range from 15 to 40. In the engine 1 of this embodiment, the compression ratio is equal to the expansion ratio. Thus, the engine 1 has a high compression ratio and a relatively high expansion ratio at the same time. An increase in the geometric compression ratio improves the thermal efficiency.

As shown in FIG. 1, the combustion chamber 17 is defined by the wall surface of the cylinder 11, the crown surface of the piston 15, the lower surface (i.e., the ceiling surface) of the cylinder head 13, and surfaces of the intake valve 21 and the exhaust valve 22 at the valve head. These surfaces are provided with the heat insulating layers 61, 62, 63, 64, and 65, respectively, to reduce cooling loss. This insulates the combustion chamber 17 from heat. In the following description, the heat insulating layers 61-65 are collectively referred to "heat insulating layers" with reference numeral 6. The heat insulating layers 6 may be provided on whole or part of the defining surfaces. In the example figure, the heat insulating layer 61 on the wall surface of the cylinder is located at a higher position than piston rings 14 when the piston 15 is located at the top dead center, thereby preventing the piston rings 14 from sliding along the heat insulating layer 61. The heat insulating layer 61 on the wall surface of the cylinder is not limited to this structure. The heat insulating layer 61 may extend downward to cover whole or part of the area corresponding to the stroke of the piston 15. Although not directly defining the combustion chamber 17, the wall surfaces of the intake ports 18 and the exhaust ports 19 may be provided with heat insulating layers near the openings at the ceiling surface of the combustion chamber 17. The thicknesses of the heat insulating layers 61-65 shown in FIG. 1 are not the actual ones but mere examples, which do not indicate the magnitude relations among the thicknesses of the heat insulating layers.

The heat insulating structure of the combustion chamber 17 will be further described in detail. As described above, the heat insulating structure of the combustion chamber 17 is comprised of the heat insulating layers 61-65 provided on the defining surfaces which define the combustion chamber 17. These heat insulating layers 61-65 have lower thermal conductivity than a metal base member of the combustion chamber 17 to reduce release of the heat of the combustion gas within the combustion chamber 17 through the defining surfaces. The heat insulating layer 61 is provided on the wall surface of the cylinder 11. The base member on which the heat insulating layer 61 is provided is thus the cylinder block 12. The heat insulating layer 62 is provided on the crown surface of the piston 15. The base member on which the heat insulating layer 62 is provided is thus the piston 15. The heat insulating layer 63 is provided on the ceiling surface of the cylinder head 13. The base member on which the heat insulating layer 63 is provided is thus the cylinder head 13. The heat insulating layers 64 and 65 are provided on the valve head surfaces of the intake valve 21 and the exhaust valve 22, respectively. The base members on which the heat insulating layers 64 and 65 are provided are thus the intake valve 21 and the exhaust valve 22, respectively. Therefore, as the materials of the base members, the cylinder block 12, the cylinder head 13, and the piston 15 are made of an aluminum alloy or cast iron, and the intake valve 21 and the exhaust valve 22 are made of heat resistant steel, cast iron, for example.

The heat insulating layers 6 may have lower volumetric specific heat than the base members to reduce the cooling loss. Specifically, the gas temperature within the combustion chamber 17 changes in progress of the combustion cycle. In a typical engine without the heat insulating structure of the combustion chamber 17, cooling water flows in a water jacket formed in a cylinder head and a cylinder block. This maintains the temperature of the surfaces defining the combustion chamber 17 substantially constant, regardless of the progress of the combustion cycle.

On the other hand, the cooling loss is determined by the following equation.

Cooling Loss=Heat Transfer Coefficient×Heat Transfer Area×(Gas Temperature−Temperature of Defining Surfaces)

Thus, the cooling loss increases with an increase in the difference between the gas temperature and the temperature of the wall surfaces. In order to reduce the cooling loss, the difference between the gas temperature and the temperature of the wall surfaces may be reduced. If the cooling water maintains the temperature of the defining surfaces of the combustion chamber 17 substantially constant, an increase in the temperature difference in accordance with a change in the gas temperature is inevitable. Thus, the thermal capacity of the heat insulating layers 6 may be reduced so that the temperature of the defining surfaces of the combustion chamber 17 change in accordance with a change in the gas temperature within the combustion chamber 17.

The heat insulating layers 6 may be formed by coating a ceramic material such as $ZrO_2$ on the base member by plasma splay coating. The ceramic material may contain numbers of pores. This reduces the heat transfer coefficient and the volumetric specific heat of the heat insulating layers 6.

In this embodiment, as shown in FIG. 1, an aluminum titanate port liner 181 with a significantly low heat transfer coefficient, excellent heat insulating characteristics, and excellent heat resistance are integrally casted in the cylinder head 13, thereby providing the heat insulating layers in the intake ports 18. This structure reduces and avoids a temperature rise of the fresh air due to the heat received from the cylinder head 13 in passing through the intake ports 18. This reduces the temperature of the fresh air (i.e., the initial gas temperature) introduced into the cylinder 11 to reduce the gas temperature in the combustion. This is advantageous in reducing the difference between the gas temperature and the temperature of the defining surfaces of the combustion chamber 17. The reduction in the gas temperature in combustion could reduce the heat transfer coefficient, which is advantageous in reducing the cooling loss. The structure of the heat insulating layer provided in each intake port 18 is not limited to the cast of the port liner 181.

In this engine 1, as described above, the geometric compression ratio $\epsilon$ falls within the ranges from 15 to 40. In the Otto cycle, which is the theoretical cycle, the theoretical thermal efficiency $\eta_{th}$ is expressed by the equation $\eta_{th}=1-1/(\epsilon^{K-1})$. The theoretical thermal efficiency $\eta_{th}$ increases with an increase in the compression ratio $\epsilon$. However, the indicated thermal efficiency of engines (specifically, engines without any heat insulating structure in combustion chambers) peaks at a predetermined geometric compression ratio $\epsilon$ (e.g., about 15). Even if the geometric compression ratio ε further increases, the indicated thermal efficiency does not increase, but on the contrary, decreases. This is because the combustion pressure and the combustion temperature increase with an increase in the compression ratio, when the geometric compression ratio increases while maintaining the fuel amount and the intake amount constant. As described above, as the combustion pressure and the combustion temperature increase, the cooling loss also increases.

By contrast, in the engine 1, the heat insulating structure of the combustion chamber 17 is combined as described above so that the indicated thermal efficiency is high at a high geometric compression ratio ε. That is, the cooling loss is reduced by the heat insulating characteristics of the combustion chamber 17, thereby increasing the indicated thermal efficiency.

On the other hand, the heat insulating characteristics of the combustion chamber 17 for reducing the cooling loss do not contribute to an improvement in the indicated thermal efficiency, since the reduced cooling loss is converted to the exhaust loss. In the engine 1, as described above, an increase in the expansion ratio in accordance with an increase the compression ratio efficiently converts the energy of the combustion gas corresponding to the reduced cooling loss to mechanical work. In short, the engine 1 largely improves the indicated thermal efficiency by employing the structure reducing both the cooling loss and the exhaust loss.

This engine 1 includes the heat insulating gas layers (hereinafter simply referred to as gas layers) as the heat insulating layers in the cylinder (i.e., in the combustion chamber 17) in addition to the heat insulating structures of the combustion chamber 17 and the intake ports 18, thereby further reducing the cooling loss. This point will now be described in detail.

Figure 3:
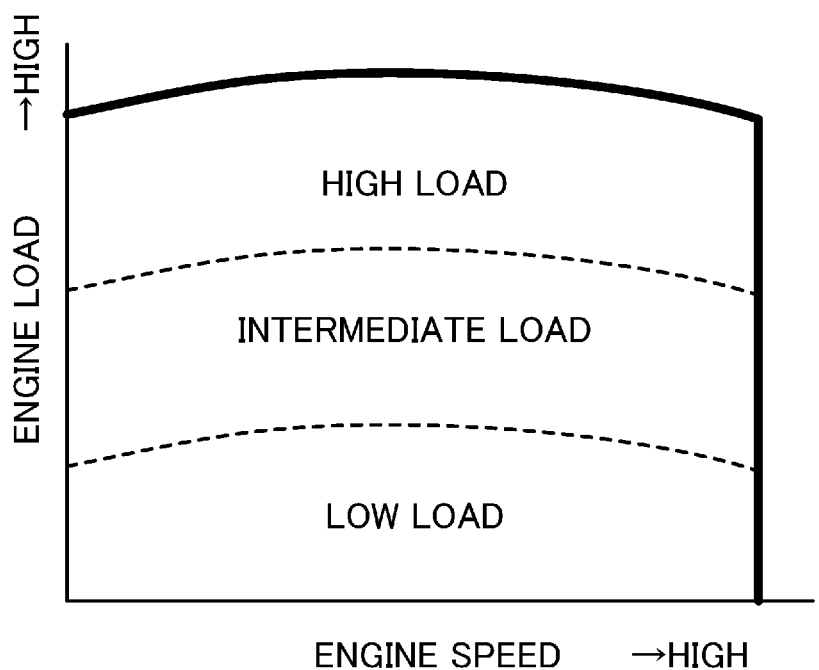
FIG. 3 is an exemplary operation map of the engine.

FIG. 3 illustrates an example operation map when the engine 1 is warm. In all operation ranges, the engine 1 basically performs combustion by compression auto-ignition of the air-fuel mixture in the combustion chamber 17. In the operation map of FIG. 3, a heat insulating layer being a gas layer is formed in the combustion chamber 17 in a low load range, in which the engine has a load lower than a predetermined load, and in an intermediate load range in which the engine has a load higher than in the low load range. That is, in an operational state, in which the engine has a relatively low load and relatively little fuel is injected, the formation of the heat insulating layer being the gas layer in the combustion chamber 17 reduces the cooling loss to improve the thermal efficiency. The low and intermediate load ranges here may be defined as low and intermediate ranges when the engine load region is divided (e.g., equally) into three regions of low, intermediate, and high regions. In particular, in the intermediate load range, the engine has, for example, a load of a predetermined percentage or lower of a full load (e.g., lower than 70%).

Figure 4:
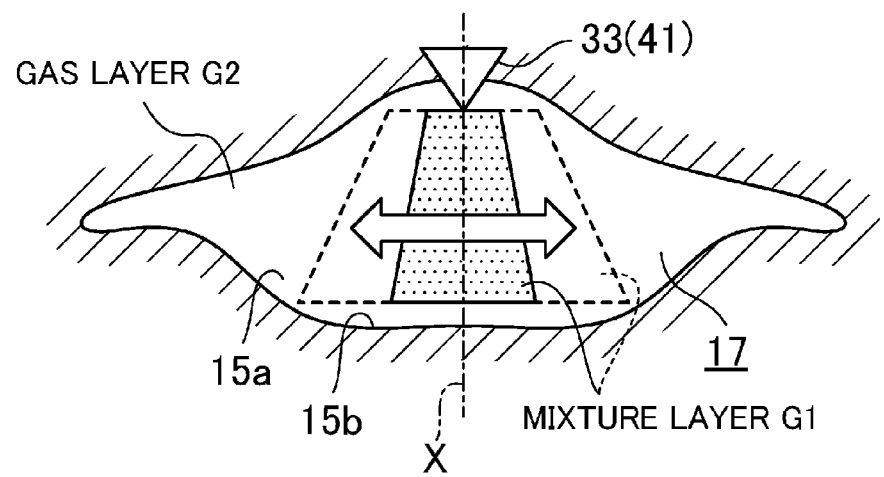
FIG. 4 is a conceptual cross-sectional view illustrating the form of a mixture layer formed in a combustion chamber.

FIG. 4 conceptually illustrates the form of a mixture layer formed in a combustion chamber 17 in the low and intermediate load ranges. Forming a heat insulating layer being a gas layer in the combustion chamber 17 means, as shown in the figure, forming a mixture layer G1 in a central portion of the combustion chamber 17 and a gas layer G2 containing fresh air around the mixture layer G1.

The mixture layer G1 here is defined as a layer of a combustible air-fuel mixture (e.g., with an equivalence ratio φ of 0.1 or higher). The size of the mixture layer G1 is the size as of the time of ignition, since the fuel spray disperses as the time passes after the start of fuel injection. Ignition is determined, for example, when the mass fraction of burned fuel is 1% or higher.

The gas layer G2 is defined as a layer of an air-fuel mixture with an equivalence ratio φ lower than 0.1. The gas layer G2 may contain fresh air only, or in addition, burnt gas (i.e., EGR gas). As described later, as long as the gas layer G2 functions as a heat insulating layer, a small amount of fuel may be mixed into the gas layer G2.

The mixture layer G1 and the gas layer G2 in the combustion chamber become visible by Schlieren imaging or a means for optically reading fuel spray containing silicone oil. Based on the visible fuel spray, the equivalence ratio φ is obtained to distinguish the mixture layer G1 from the gas layer G2. The mixture layer G1 is distinguishable from the gas layer G2 based on the brightness corresponding to a predetermined equivalence ratio φ, for example.

Reduction in an S/V ratio of the mixture layer G1, which is the ratio of the surface area (S) to its volume (V), reduces the area of the mixture layer G1 transferring heat to/from the gas layer G2 in the combustion. In addition, the gas layer G2 between the mixture layer G1 and the wall surface of the cylinder 11 reduces the contact of the flame of the mixture layer G1 with the wall surface of the cylinder 11 and an inner wall 15b of the cavity 15a. Furthermore, the gas layer G2 itself functions as a heat insulating layer to reduce heat radiated from the wall surface of the cylinder 11 and the inner wall 15b of the cavity 15a. This results in significant reduction in the cooling loss.

The engine controller 100 outputs, to an electric circuit of the fuel supply system 34, an injection signal for injecting fuel from the nozzle port 41 of the injector 33 into the cylinder 11 in the period including the second half of the compression stroke and the initial stage of the expansion stroke to form the mixture layer G1 in the central portion of the combustion chamber 17 and the gas layer G2 around the mixture layer G1. The second half of the compression stroke is the second half where the compression stroke is divided (e.g., equally) into two of first and second halves. The initial stage of the expansion stroke is the initial stage where the expansion stroke is divided (e.g., equally) into three of the initial, intermediate, and terminal stages.

In the low load range, a relatively small amount of fuel is injected. Thus, the fuel is injected from the injector 33 on the central axis X of the cylinder 11 into the cylinder 11 in the period including the second half of the compression stroke and the initial stage of the expansion stroke to reduce the spread of fuel spray. Then, the mixture layer G1 in the central portion of the combustion chamber 17 and the gas layer G2 around the mixture layer G1 are relatively easily formed. However, the more the fuel is injected, the longer the fuel injection time is. The fuel spray particularly spreads along the central axis X of the cylinder 11. As a result, the mixture layer G1 comes into contact with the crown surface of the piston 15 including the inner wall 15b of the cavity 15a, for example. That is, the gas layer G2 is not reliably formed around the mixture layer G1. As described above, this engine 1 has a high geometric compression ratio, and, accordingly, the combustion chamber (i.e., the space in the cylinder when the piston is located in the compression top dead center) has a small volume. Thus, in the engine 1, when the fuel spray spreads along the central axis X of the cylinder 11, the mixture layer G1 easily comes into contact with the crown surface of the piston 15 including the inner wall 15b of the cavity 15a.

To address this problem, this engine 1 controls the form of the mixture layer G1 to be formed in the combustion chamber 17 to reliably form the mixture layer G1 in the central portion of the combustion chamber 17 and the gas layer G2 around the mixture layer G1 also in an intermediate load range in which the amount of injected fuel increases. Specifically, as indicated by the void arrow in FIG. 4, when the amount of injected fuel increases, the fuel spray spreads outward in the radial direction, which crosses the central axis X of the cylinder 11. This reduces an increase in the length of the mixture layer G1 along the central axis X to reduce the contact of the mixture layer G1 with the crown surface of the piston 15 including the inner wall 15b of the cavity 15a. The spread of the mixture layer G1 outward in the radial direction, which has more space than in the direction of the central axis X, reduces the contact of the mixture layer G1 with the inner wall of the cylinder 11. The form of the mixture layer G1 to be formed in the combustion chamber 17 is controlled by adjusting the ratio (L/W), where the length along the central axis is L and width in the radial direction is W of the mixture layer G1 to be formed in the combustion chamber 17. While the L/W ratio is kept at a predetermined value or greater to reduce the S/V ratio, the L/W is reduced with an increase in the amount of injected fuel.

Figure 5:
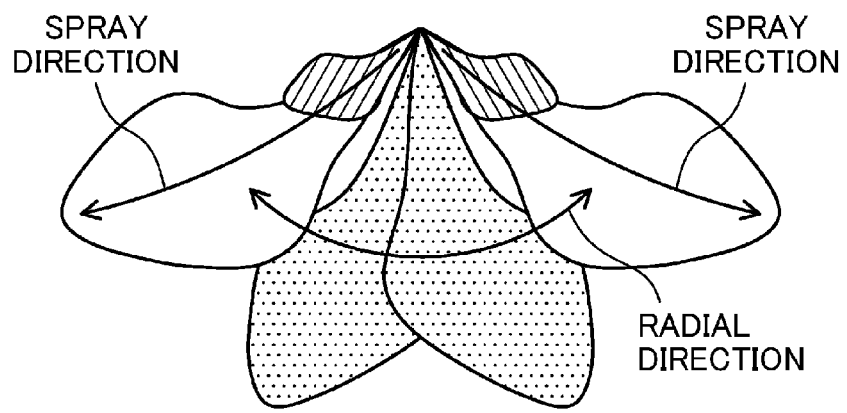
FIG. 5 illustrates the direction in which fuel spray injected from the injector spreads.
Figure 6:
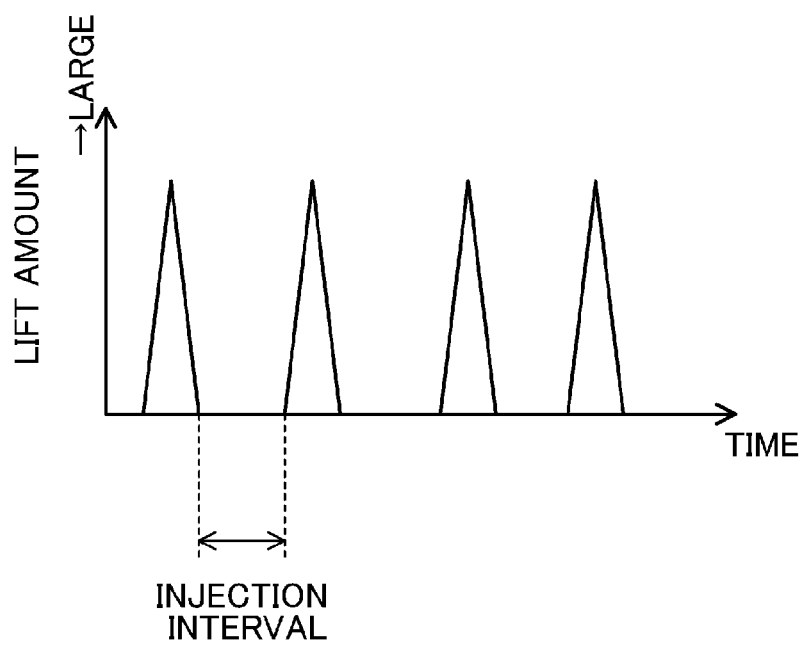
FIG. 6 illustrates intervals of fuel injection.

In order to control the form of the mixture layer G1, the interval of fuel injection by the injector 33 (see FIG. 6) and the lift amount of injected fuel (see FIG. 7) are adjusted in the engine 1. As shown in FIG. 5, the spread of fuel spray in the spray direction and in the radial direction are controlled independently. As conceptually shown in FIG. 6, the interval of fuel injection is defined as the interval from the end of a fuel injection to the start of the next fuel injection. As described above, this injector 33 is highly responsive, and performs multi-stage injection of about 20 injections in 1-2 msec. As conceptually shown in FIG. 7, the lift amount of the injector 33 is proportional to the opening area of the injector. As described above, the greater the lift amount is, the larger the opening area of the injector (i.e., the effective cross-sectional area of the nozzle port 41) is. On the other hand, the smaller the lift amount is, the smaller the opening area of the injector is.

Figure 8A:
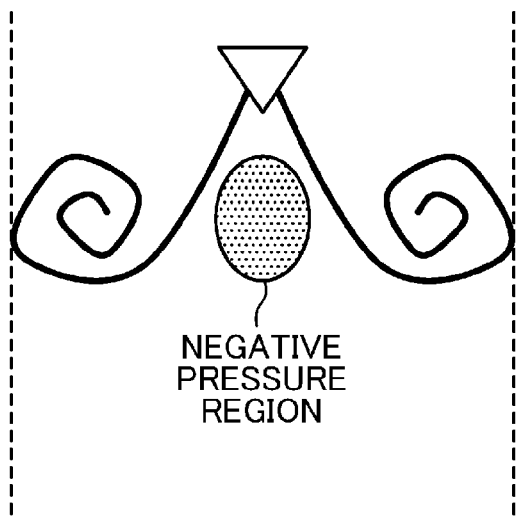
FIG. 8A is a conceptual view illustrating the spread of fuel spray where fuel is injected at long intervals.
Figure 8B:
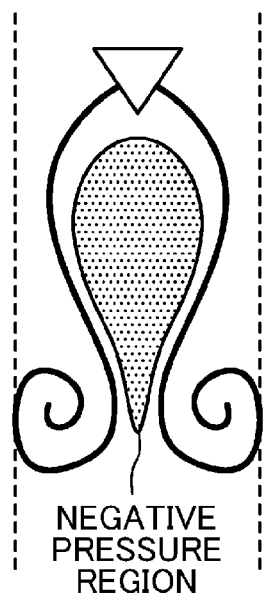
FIG. 8B is a conceptual view illustrating the spread of fuel spray where fuel is injected at short intervals.

FIGS. 8A and 8B conceptually illustrate a difference in the spread of fuel spray between where the interval of fuel injection is long (FIG. 8A) and where the interval is short (FIG. 8B). The lift amount of the injector 33 is constant. The fuel spray, which has been injected from the injector 33 in a hollow conical form, flows at a high speed in the combustion chamber 17. Thus, the Coanda effect generates a negative pressure region along the central axis S of the injector 33 inside the hollow cone. Where the interval of fuel injection is long, the pressure in the negative pressure region recovers between the fuel injection and the next fuel injection. This reduces the size of the negative pressure region. On the other hand, where the fuel injection interval is short, the fuel injection is repeated without any interval. This reduces recovery of the pressure in the negative pressure region. As a result, the size of the negative pressure region increases as shown in FIG. 8B.

The fuel spray is drawn by the negative pressure. The negative pressure region is formed in a central portion around the central axis S in the radial direction. Where the negative pressure region is relatively large, the fuel spray spreads less in the radial direction as shown in FIG. 8B. On the other hand, where the negative pressure region is relatively small, the fuel spray is less drawn by the negative pressure and thus spreads easily in the radial direction as shown in FIG. 8A. A reduction in the interval of fuel injection by the injector 33 reduces the spread of fuel spray in the radial direction. On the other hand, an increase in the injection interval accelerates the spread of fuel spray in the radial direction.

Figure 9A:
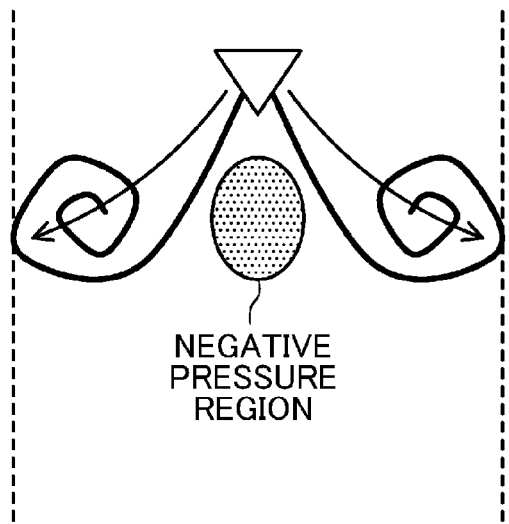
FIG. 9A is a conceptual view illustrating the spread of fuel spray where the lift amount of the injector is small.
Figure 9B:
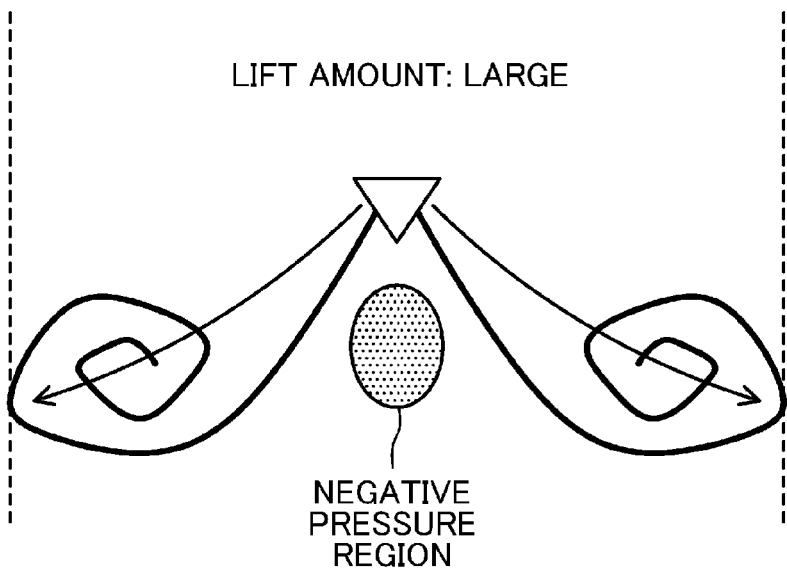
FIG. 9B is a conceptual view illustrating the spread of fuel spray where the lift amount of the injector is large.

FIGS. 9A and 9B conceptually illustrate a difference in the spread of fuel spray between where the lift amount of the injector 33 is small (FIG. 9A) and where the lift amount is large (FIG. 9B). The interval of fuel injection is uniform. In this case, since the injection interval is the same, the size of the negative pressure region of the combustion chamber 17 is the same but the lift amount differs to change the particle size of the fuel spray. A decrease in the lift amount of the injector 33 reduces the particle size of the fuel spray to reduce the momentum of the fuel spray. Thus, the fuel spray is easily drawn by the negative pressure toward the center in the radial direction. As shown in FIG. 9A, this reduces the outward spread in the radial direction. On the other hand, an increase in the lift amount of the injector 33 increases the particle size of the fuel spray to increase the momentum of the fuel spray. As a result, the fuel spray is less drawn by the negative pressure and spreads easily outward in the radial direction, as shown in FIG. 9B. That is, an increase in the lift amount of the injector 33 accelerates the spread of fuel spray in the radial direction. On the other hand, a decrease in the lift amount reduces the spread of fuel spray in the radial direction.

Fuel spray of large particles has a greater momentum and thus disperses at a long distance in the spray direction. The speed of the fuel spray of large particles is less reduced under the influence of the negative pressure region. This also increases the spray distance. On the other hand, fuel spray of small particles has a smaller momentum and thus disperses at a short distance in the spray direction. The speed of the fuel spray of small particles is reduced easily under the influence of the negative pressure region. This also reduces the spray distance.

In this manner, a change in the injection interval and lift amount of the injector 33 enables control of the spread of fuel spray in the two directions of the radial direction and the spray direction independently. Thus, in this engine 1, a first injection group and a second injection group are combined to control the form of the mixture layer G1. The first injection group includes multiple times of fuel injection with a relatively large lift amount at a relatively long injection interval. The second injection group includes multiple times of fuel injection with a relatively small lift amount at a relatively short injection interval. In each injection group, the multi-stage injection of multiple times of fuel injection is performed. The multi-stage injection here means intermittent fuel injection at an interval (from the end of a fuel injection to the next fuel injection) of 0.5 ms or shorter.

Specifically, the first injection group includes predetermined times of fuel injection in which the lift amount of the injector 33 is larger than that in the second injection group, and the interval of fuel injection is longer than that in the second injection group. An increase in the injection interval reduces the size of the negative pressure region. In addition, an increase in the lift amount increases the particle size of the fuel spray, thereby increasing the momentum of the fuel spray. This results in formation of radially wide fuel spray dispersed at a relatively long distance in the spray direction.

The second injection group includes predetermined times of fuel injection in which the lift amount of the injector 33 is smaller than that in the first injection group, and the interval of fuel injection is shorter than that in the first injection group. A decrease in the injection interval enlarges the negative pressure region. In addition, a decrease in the lift amount reduces the particle size of the fuel spray, thereby reducing the momentum of the fuel spray. This results in formation of radially compact fuel spray dispersed at a relatively short distance in the spray direction.

The engine controller 100 changes the ratio of the first and second injection groups in accordance with the operational state of the engine 1 to control the form of the mixture layer G1 in accordance with the operational state of the engine 1. The basic principle is as follows. An increase in the ratio of the first injection group leads to formation of the mixture layer G1 spreading outward in the radial direction. An increase in the ratio of the second injection group leads to formation of the mixture layer G1 spreading less outward in the radial direction.

Depending on the operational state of the engine 1, no first injection group but only the second injection group may be executed. Only one fuel injection may belong to the first injection group and the other fuel injections may belong to the second injection group No second injection group but only the first injection group may be executed. Only one fuel injection may belong to the second injection group and the other injections may belong to the first injection group. The second injection group may be executed after the first injection group. The first injection group may be executed after the second injection group.

Figure 10:
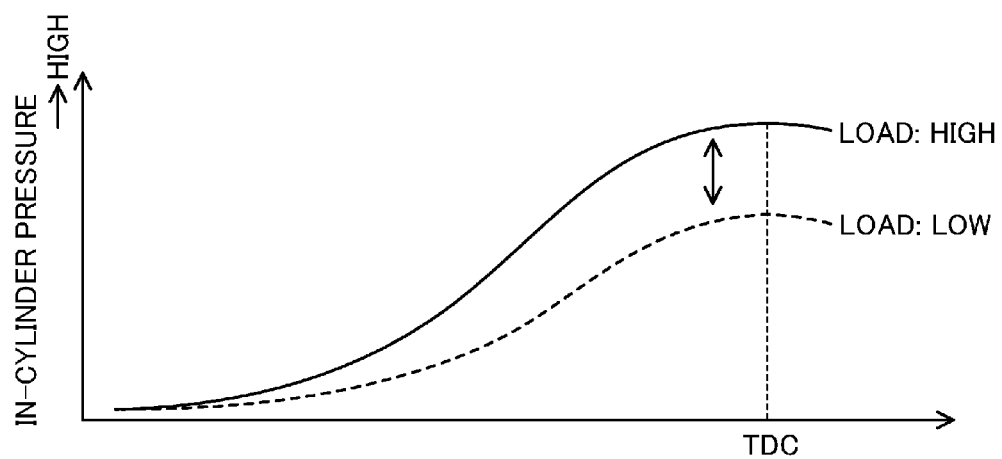
FIG. 10 illustrates a change in in-cylinder pressure relative to a crank angle.
Figure 11:
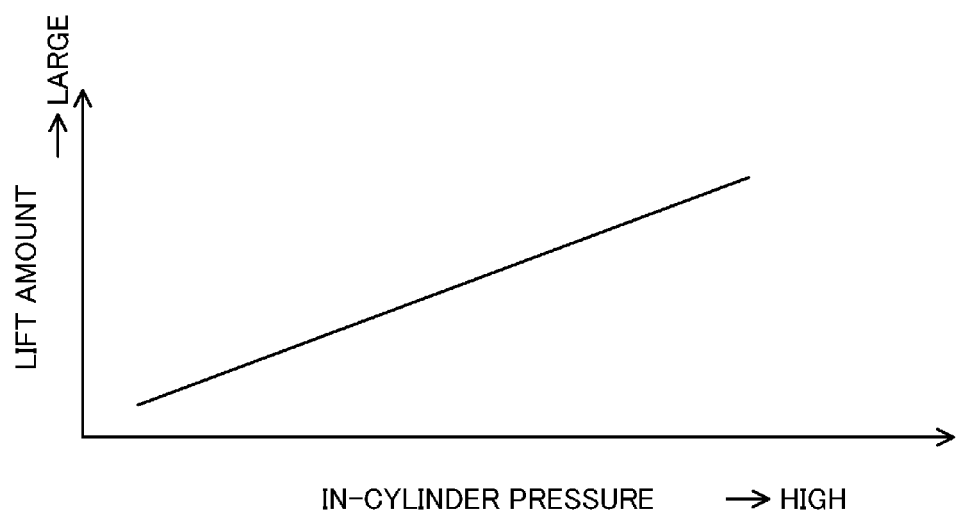
FIG. 11 illustrates a change in the lift amount relative to in-cylinder pressure.
Figure 12:
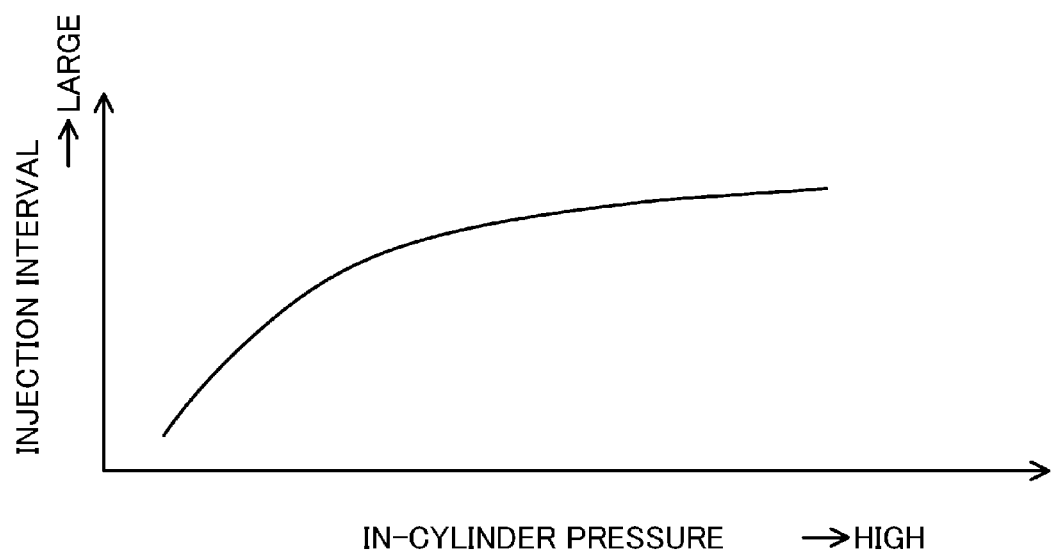
FIG. 12 illustrates a change in injection intervals relative to in-cylinder pressure.

Assuming the multi-stage injection described above, the engine controller 100 controls the injection condition more finely in accordance with the operational state of the engine 1. FIG. 10 illustrates a change in the in-cylinder pressure relative to a crank angle. FIG. 11 illustrates a change in the lift amount relative to the in-cylinder pressure. FIG. 12 illustrates a change in the injection interval relative to the in-cylinder pressure.

Specifically, the engine controller 100 adjusts the lift amount and injection interval of the injector 33 in multi-stage injection in accordance with the pressure in the combustion chamber 17 (i.e., the in-cylinder pressure) when the operational state of the engine 1 falls within the low and intermediate load ranges shown in FIG. 4.

The in-cylinder pressure changes variously in accordance with the operational state. For example, the in-cylinder pressure changes in accordance with the engine load. Specifically, the engine controller 100 adjusts the filling amount of intake air in accordance with the amount of fuel by retarding the time of closing the intake valve 21 after the bottom dead center in accordance with the engine load. Thus, as shown in FIG. 10, an increase in the engine load increases the filling amount of intake air, resulting in a rise in the in-cylinder pressure in the entire compression stroke. On the other hand, a decrease in the engine load reduces the filling amount of intake air, resulting in a decrease in the in-cylinder pressure in the entire compression stroke.

The engine controller 100 calculates the in-cylinder pressure based on the opening degree of the throttle valve 20, the time of closing the intake valve 21, and the crank angle, for example, and adjusts the injection condition of the injector 33 in accordance with the calculated in-cylinder pressure.

With an increase in the in-cylinder pressure, the engine controller 100 adjusts the injection condition of the injector 33 so that the fuel spray spreads more. Specifically, as shown in FIG. 11, the engine controller 100 increases the lift amount with an increase in the in-cylinder pressure. In addition, as shown in FIG. 12, the engine controller 100 increases the injection interval with an increase in the in-cylinder pressure. The lift amount and the injection interval are parameters of the injector 33 for adjusting the spread of fuel spray.

The in-cylinder pressure here is a representative in-cylinder pressure in each combustion cycle. For example, the engine controller 100 adjusts the lift amount and the injection interval as described above in accordance with the in-cylinder pressure at the start of injection in each combustion cycle. In each combustion cycle, the in-cylinder pressure as of which time is used to adjust the lift amount and the injection interval is determined freely. For example, instead of the start of injection, the in-cylinder pressure at the end of injection or at the compression top dead center may be used. In short, the in-cylinder pressure at any time may be used so long as how much the fuel spray spreads in the combustion chamber 17 can be found.

The lift amount increases linearly relative to the in-cylinder pressure.

On the other hand, the injection interval less influences the spread of fuel spray once reaching a certain length. Thus, the amount of increase in the injection interval is reduced with an increase in the in-cylinder pressure. When the in-cylinder pressure is high, a large amount of fuel is injected for a long period. In addition, an increase in the injection interval further increases the time of injection. The amount of the increase in the injection interval is reduced with an increase in the in-cylinder pressure to reduce the extension of injection time where a large amount of fuel is injected. This enables injection of all fuel needed in the limited time of the second half of the compression stroke by a predetermined time to cause auto-ignition combustion at a proper time.

Figure 13:
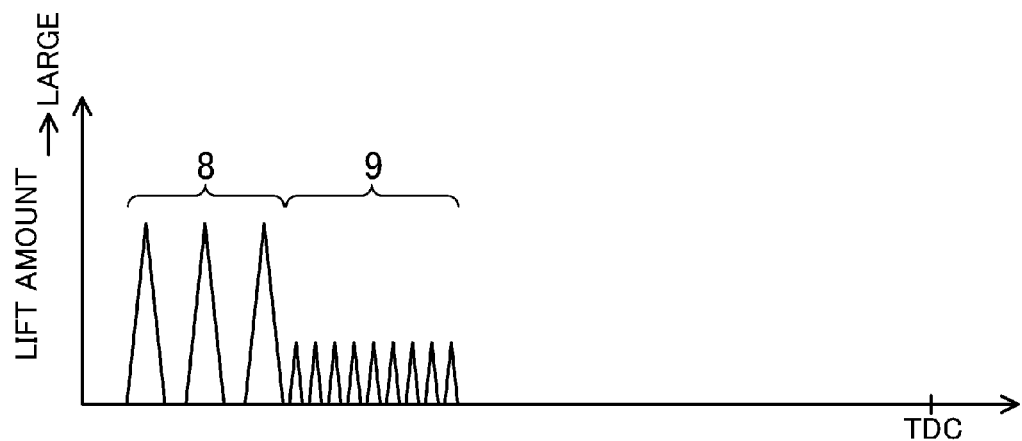
FIG. 13 illustrates injection condition at a low load.
Figure 14:
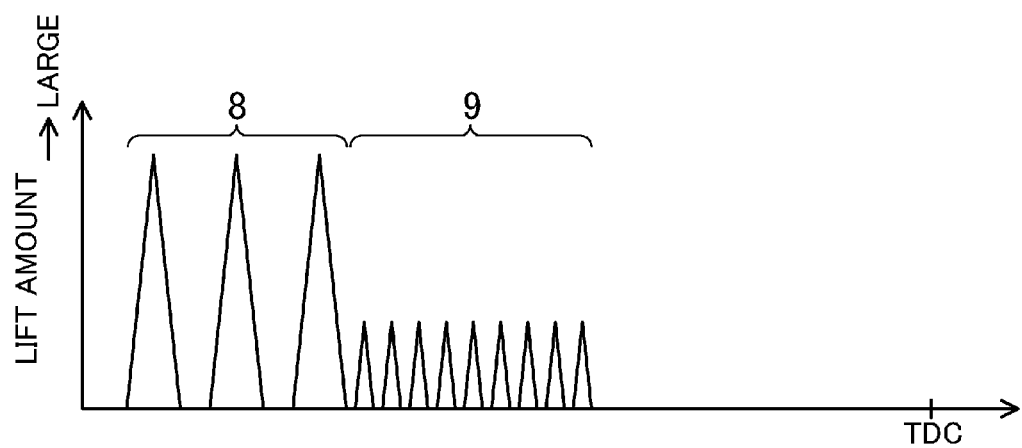
FIG. 14 illustrates injection condition at a high load.

Specific conditions of injection are shown in FIGS. 13 and 14. FIG. 13 illustrates an injection condition where the in-cylinder pressure is relatively low. FIG. 14 illustrates an injection condition where the in-cylinder pressure is relatively high. In each case, the engine controller 100 executes the first injection group 8 and the second injection group 9. The engine controller 100 controls such that the higher the in-cylinder pressure is, the larger the lift amount is and the longer the injection interval is in the first injection group 8 and the second injection group 9. An increase in the lift amount facilitates the dispersion of the fuel spray and wide fuel spray. An increase in the injection interval reduces the size of the negative pressure region, which also leads to wide fuel spray.

Since the in-cylinder pressure is high, the actual fuel spray spreads not as much as the amount of adjustment of the lift amount and injection interval, even if the lift amount and injection interval are increased. That is, the injection condition under which the fuel spray spreads easily cancels the cylinder environment in which the fuel spray spreads less. This facilitates formation of a desired air-fuel mixture.

For example, in the low and intermediate load ranges, as described above, the mixture layer G1 is formed in the central portion of the combustion chamber 17 and the gas layer G2 is formed around the mixture layer G1. With a rise in the engine load, the amount of fuel increases. Accordingly, the in-cylinder pressure rises to cause the cylinder environment in which the fuel spray spreads less. This tends to reduce the size of the mixture layer G1. With an increase in the amount of fuel, and, in addition, with a decrease in the size of the mixture layer G1, a fuel rich portion is locally formed to increase the possibility of pre-ignition.

On the contrary, with an increase in the in-cylinder pressure, the lift amount and the injection interval are increased to cause the injection condition in which the fuel spray spreads easily against the environment in which the fuel spray spreads less. This reduces a decrease in the size of the mixture layer G1 caused by a rise in the in-cylinder pressure. For example, the spread of fuel spray, that is, the spread of the mixture layer G1, is wider than or almost equal to that where the in-cylinder pressure is low. As a result, pre-ignition is reduced.

With a change in the engine load, the time of fuel injection also changes. For example, in a relatively low load operation range (i.e., a range in which the pressure increase rate dP/dθ is relatively low in combustion) free from a problem of combustion noise, the start time of fuel injection is advanced with an increase in the amount of fuel. This is because there is a need to obtain a proper ignition delay to inject all the fuel by a predetermined time suitable for auto-ignition combustion. On the other hand, in an operation range (i.e., a range in which the pressure increase rate dP/dθ is relatively high in combustion) with a large amount of fuel and a problem of combustion noise, the time of auto-ignition combustion is retarded to retard the start of fuel injection to reduce the pressure increase rate dP/dθ. As shown in FIG. 10, the in-cylinder pressure in the compression stroke changes in accordance with the crank angle. Thus, a change in the time of fuel injection changes the in-cylinder pressure in fuel injection and dispersion of the fuel spray. For example, even if the fuel is injected in the second half of the compression stroke, the in-cylinder pressure is largely different between the injection at an earlier stage and at a later stage of the second half of the compression stroke.

To address the problem, the engine controller 100 adjusts the lift amount and the injection interval in accordance with not only the representative in-cylinder pressure in each combustion cycle, but also a change in the time of fuel injection. That is, where the fuel injection is advanced and starts when the in-cylinder pressure is relatively low, the engine controller 100 adjusts the lift amount to be relatively small and the injection interval to be relatively short. On the other hand, where the fuel injection is retarded and starts when the in-cylinder pressure is relatively high, the engine controller 100 adjusts the lift amount to be relatively large and the injection interval to be relatively long.

As described above, the engine 1 includes the engine body, the injector 33, and the engine controller 100. The engine body includes the piston 15 in the cylinder 11, and the combustion chamber 17 defined by the cylinder 11 and the piston 15. The injector 33 injects fuel containing at least gasoline into the combustion chamber 17 via the nozzle port 41. In at least a second half of the compression stroke, the engine controller 100 allows the injector 33 to inject the fuel and controls the injection condition of the injector 33. The injector 33 has the parameter adjusting the spread of fuel spray. The engine controller 100 adjusts the parameter to increase the spread of fuel spray with an increase in the pressure in the combustion chamber 17.

Specifically, the engine 1 includes the engine body, the injector 33, and the engine controller 100. The engine body includes the piston 15 in the cylinder 11, and the combustion chamber 17 defined by the cylinder 11 and the piston 15. The injector 33 injects fuel containing at least gasoline into the combustion chamber 17 via the nozzle port 41. The engine controller 100 allows the injector 33 to inject the fuel in at least a second half of the compression stroke, and controls the injection condition of the injector 33. The injector 33 can adjust the effective cross-sectional area of the nozzle port 41. The engine controller 100 adjusts at least one of the effective cross-sectional area of the nozzle port 41 and the injection interval in multi-stage injection in accordance with the pressure in the combustion chamber 17.

More specifically, the engine controller 100 increases the effective cross-sectional area of the nozzle port 41 and/or the injection interval in the case of multi-stage injection, with an increase in the pressure in the combustion chamber 17.

This structure adjusts the injection condition of the injector 33 so that the fuel spray spreads more with an increase in the pressure in the combustion chamber 17 to cause the cylinder environment in which the fuel spray spreads less. This reduces a decrease in the fuel spray that is caused by a rise in the in-cylinder pressure, thereby forming a desired air-fuel mixture.

OTHER EMBODIMENTS

The embodiments are described above as examples. However, the present disclosure is not limited thereto, and is applicable to other embodiments in which variations, replacements, additions, and omissions are made. The elements described in the embodiment above may be combined to provide another embodiment. The elements shown in the drawings and the detailed description are not only the elements essential for achieving the object of the present disclosure but also the elements not essential. Even if those elements are shown in the drawings and the detailed description, it does not necessarily mean that they are the essential elements.

The embodiment may be as follows.

For example, the lift amount and the injection interval are adjusted in accordance with the in-cylinder pressure not only in the low and intermediate load ranges. They may be adjusted in accordance with the in-cylinder pressure in the other operation ranges.

While, in the embodiment described above, both the lift amount and the injection interval are adjusted to adjust the spreadability of fuel spray. The present disclosure is not limited thereto. Only one of the lift amount and the injection interval may be adjusted to adjust the spreadability of fuel spray.

The parameter for adjusting the spreadability of fuel spray is not limited to the lift amount and injection interval. For example, the fuel pressure may be adjusted to adjust the spreadability of fuel spray. Since a rise in the fuel pressure increases the kinetic energy of fuel spray, the fuel spray becomes spreadable. Furthermore, a combination of the lift amount, the injection interval, and the fuel pressure further increases the changeability in the form of the mixture layer. Specifically, when the lift amount of the injector 33 is increased by a rise in the fuel pressure, the kinetic energy of fuel spray increases. When the interval of fuel injection is reduced, the degree of the negative pressure becomes high to further enlarge the negative pressure region. This result in a further increase in the changeability in the form of the mixture layer.

The form of the mixture layer G1 to be formed with an increase in the lift amount and the injection interval in accordance with a rise in the in-cylinder pressure needs to be larger than that than in the case where the lift amount and the injection interval re not adjusted. The form of the mixture layer G1 is not necessarily larger than that where the in-cylinder pressure is low.

A change in the lift amount and the injection interval relative to in-cylinder pressure as shown in FIGS. 11 and 12, respectively, are mere examples. The lift amount and the injection interval may be changed in a different manner In the embodiment described above, the lift amount and the injection interval are adjusted uniformly in accordance with the in-cylinder pressure during the entire fuel injection in each combustion. The lift amount and the injection interval may be adjusted partially in a series of fuel injection in each combustion cycle. For example, in a series of fuel injection in each combustion cycle, the lift amount and the injection interval may be small and short in a part under a low in-cylinder pressure, and may be large and long in a part under a high in-cylinder pressure.

While, in the embodiment described above, in the low and intermediate load ranges, the fuel is injected in the second half of the compression stroke, the present disclosure is not limited thereto. In addition to the fuel injection in the second half of the compression stroke, the fuel injection may start before the second half of the compression stroke, and may continue after the compression top dead center.

While the multi-stage injection of the first and second injection groups 8 and 9 are performed as shown in FIGS. 13 and 14, the injection condition is not limited thereto. For example, one of the first or second injection group 8 or 9 may be performed. A single injection may be performed as shown in FIGS. 16B and 17B.

Figure 16A:
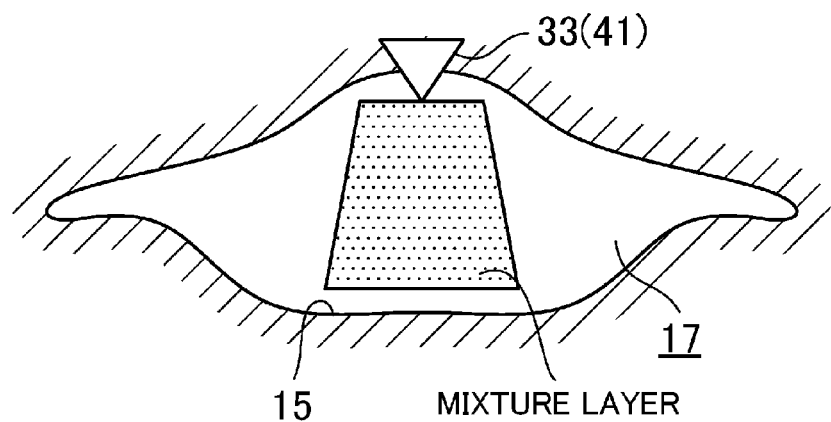
FIG. 16A illustrates the form of a mixture layer when in-cylinder pressure is relatively high.
Figure 16B:
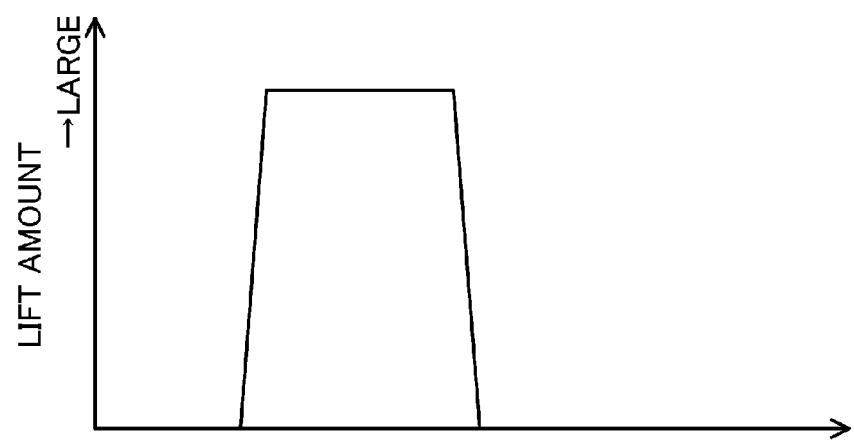
FIG. 16B illustrates injection condition at this time.
Figure 17A:
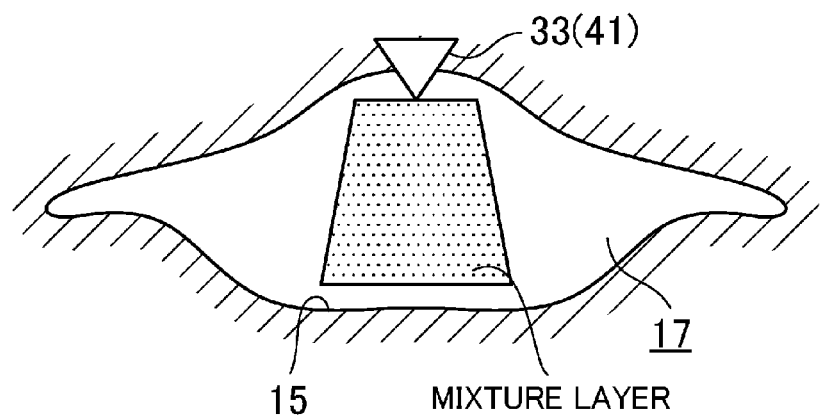
FIG. 17A illustrates the form of a mixture layer when in-cylinder pressure is relatively low.
Figure 17B:
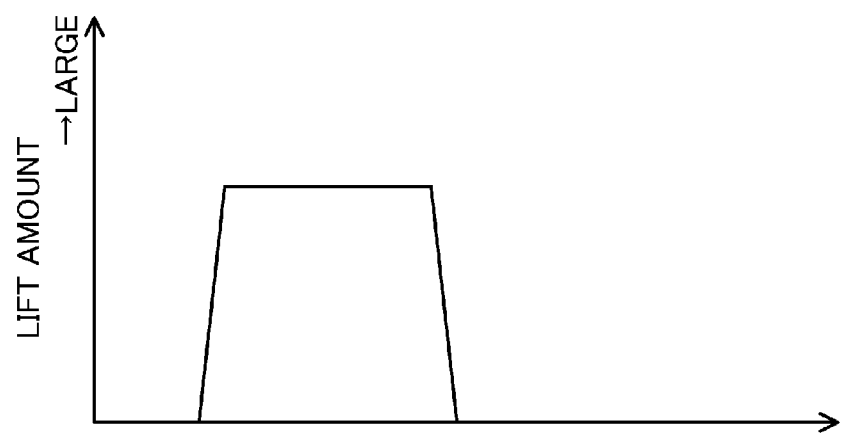
FIG. 17B illustrates injection condition at this time.

FIGS. 16B and 17B illustrate the lift amount of the injector 33 under an in-cylinder pressure which differs depending on the time of closing the intake valve 21. FIGS. 16A and 16B illustrate a relatively high in-cylinder pressure under which the lift amount is large, and the in-cylinder pressure is relatively low. FIGS. 17A and 17B illustrate that the lift amount is small but the size of the mixture layer formed in the combustion chamber 17 is the same. The amount of injected fuel is almost the same. Under a high in-cylinder pressure, the fuel spray is hardly diffused, and the amount of fuel injected from the injector 33 also decreases due to a high resistance.

Figure 15:
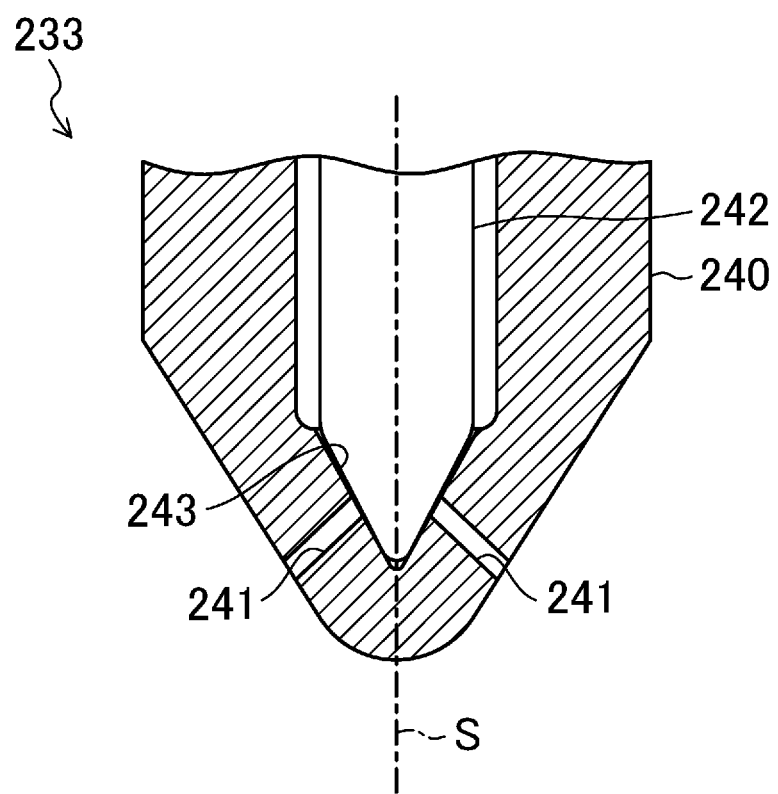
FIG. 15 is a cross-sectional view illustrating the internal structure of an injector according to another embodiment.

The structure of the injector is not limited thereto what is disclosed in the embodiment described above. As long as the effective cross-sectional area of the injection port is changeable, any injector may be used. For example, an injector 233 with a valve covered orifice (VCO) nozzle shown in FIG. 15 may be used. FIG. 15 is a cross-sectional view illustrating the internal structure of the injector 233.

Specifically, the injector 233 includes a nozzle body 240 and a needle valve 242. The nozzle body 240 includes a nozzle port 241 injecting the fuel into the cylinder 11. The needle valve 242 opens and closes the nozzle port 241. The nozzle body 240 is a tubular member extending along a predetermined central axis S. The fuel flows inside the nozzle body 240. The tip of the nozzle body 240 is shaped in a cone. A conical seat 243 is formed on the inner peripheral surface of the tip of the nozzle body 240. A plurality of nozzle ports 241 penetrate through the tip of the nozzle body 240. One end of each nozzle port 241 is open to the seat 243. The nozzle ports 241 are provided at equal intervals around the central axis S. The tip of the needle valve 242 is shaped in a cone and set on the seat 243 of the nozzle body 240. The nozzle port 241 is closed by setting the needle valve 242 on the seat 243. The nozzle port 241 is an example injection port. The needle valve 242 is an example valve body.

Like the injector 33, the needle valve 242 is driven by the piezo element. When the needle valve 242 is driven and lifted from the seat 243, a space in which the fuel can flow is formed between the seat 243 and the needle valve 242. The fuel flowing in this space is injected outside the nozzle body 240 through the nozzle ports 241.

At this time, that is, when the fuel flows, cavitation occurs at the inner peripheral surface of the nozzle ports 241. The degree of this cavitation (e.g., the area in which the cavitation occurs) changes in accordance with the space between the needle valve 242 and the seat 243, that is, the lift amount of the needle valve 242. Specifically, the lift amount of the needle valve 242 is small and the space between the needle valve 242 and the seat 243 is small, the cavitation occurs in a large area. On the other hand, when the lift amount of the needle valve 242 is large and the space between the needle valve 242 and the seat 243 is large, the cavitation occurs in a small area. If the cavitation occurs in a large area, the effective cross-sectional area of the nozzle port 241 becomes small. If the cavitation occurs in a small area, the effective cross-sectional area of the nozzle port 241 becomes large. With a decrease in the lift amount of the needle valve 242, the effective cross-sectional area of the nozzle port 241 decreases. With an increase in the lift amount of the needle valve 242, the effective cross-sectional area of the nozzle port 241 increases.

In the example described above, the combustion chamber 17 and the intake port 18 have a heat insulating structure. The present disclosure is also applicable to an engine employing no heat insulating structure in the combustion chamber 17 and the intake port 18.

While the engine 1 described above performs combustion by compression auto-ignition in all operation ranges, the present disclosure is not limited thereto. Combustion may be caused by ignition with a spark plug. Compression auto-ignition and ignition with a spark plug may be switched in accordance with the operation range.

INDUSTRIAL APPLICABILITY

As described above, the present disclosure is useful as a device for controlling a direct-injection gasoline engine.

DESCRIPTION OF REFERENCE CHARACTERS

1 Engine
11 Cylinder
15 Piston
15a Cavity
15b Inner Wall
17 Combustion Chamber
33 Injector
40 Nozzle Body
41 Nozzle Port (Injection Port)
42 Outward Opening Valve (Valve Body)
100 Engine Controller (Controller)
233 Injector
241 Nozzle Port (Injection Port)
242 Needle Valve (Valve Body)
S Central Axis
X Central Axis

The invention claimed is:
1. A device for controlling a direct-injection gasoline engine, the device comprising:
an engine body including a piston inside a cylinder, and a combustion chamber defined by the cylinder and the piston;
an injector injecting fuel containing at least gasoline into the combustion chamber via an injection port; and
a controller allowing the injector to inject the fuel in at least a second half of a compression stroke, and controlling an injection condition of the injector; wherein
the injector has a parameter for adjusting spread of fuel spray,
pressure in the combustion chamber is increased by controlling such that the higher an engine load is, the larger a filling amount of intake air is, and
in low and intermediate engine load ranges, the controller allows the injector to inject the fuel in the second half of the compression stroke to form, at ignition of an air-fuel mixture of the mixture layer formed in the combustion chamber, a gas layer of fresh air and/or burnt gas between the mixture layer and a wall surface which defines the combustion chamber,
predicts the pressure in the combustion chamber, and
adjusts the parameter so that the spread of fuel spray is greater when the predicted pressure is high than that when the predicted pressure is low, even if a same amount of fuel is injected.

2. The device of claim 1, wherein
the controller adjusts the parameter so that the spread of fuel spray increases with an increase in the predicted pressure, even if the same amount of fuel is injected.

3. The device of claim 1, wherein
the parameter is an effective cross-sectional area of the injection port,
the controller controls the effective cross-sectional area of the injection port to be larger when the predicted pressure is high than that when the predicted pressure is low, even if the same amount of fuel is injected.

4. The device of claim 1, wherein
the parameter is an injection interval in multi-stage injection,
the controller allows the injector to perform the multi-stage injection in at least the second half of the compression stroke, and
the controller controls the injection interval to be longer when the predicted pressure is high than that when the predicted pressure is low, even if the same amount of fuel is injected.

5. The device of claim 1, wherein
the parameter is an effective cross-sectional area of the injection port and an injection interval in multi-stage injection,
the controller allows the injector to perform the multi-stage injection in at least the second half of the compression stroke, and
the controller controls the effective cross-sectional area of the injection port to be larger and the injection interval to be longer when the predicted pressure is high than that when the predicted pressure is low, even if the same amount of fuel is injected.

6. The device of claim 3, wherein
the injector includes
a nozzle body with the injection port, and
a valve body opening and closing the injection port,
the effective cross-sectional area of the injection port changes in accordance with a lift amount of the valve body, and
the effective cross-sectional area of the injection port increases with an increase in the lift amount of the valve body.

7. The device of claim 1, wherein
the wall surface of the combustion chamber is an inner peripheral surface of a recessed cavity formed in a crown surface of the piston.

8. The device of claim 2, wherein
the parameter is an effective cross-sectional area of the injection port,
the controller controls the effective cross-sectional area of the injection port to be larger when the predicted pressure is high than that when the predicted pressure is low, even if the same amount of fuel is injected.

9. The device of claim 8, wherein
the injector includes
a nozzle body with the injection port, and
a valve body opening and closing the injection port,
the effective cross-sectional area of the injection port changes in accordance with a lift amount of the valve body, and
the effective cross-sectional area of the injection port increases with an increase in the lift amount of the valve body.

10. The device of claim 2, wherein
the parameter is an injection interval in multi-stage injection,
the controller allows the injector to perform the multi-stage injection in at least the second half of the compression stroke, and
the controller controls the injection interval to be longer when the predicted pressure is high than that when the predicted pressure is low, even if the same amount of fuel is injected.

11. The device of claim 2, wherein
the parameter is an effective cross-sectional area of the injection port and an injection interval in multi-stage injection,
the controller allows the injector to perform the multi-stage injection in at least the second half of the compression stroke, and
the controller controls the effective cross-sectional area of the injection port to be larger and the injection interval to be longer when the predicted pressure is high than that when the predicted pressure is low, even if the same amount of fuel is injected.

12. The device of claim 2, wherein
the wall surface of the combustion chamber is an inner peripheral surface of a recessed cavity formed in a crown surface of the piston.

13. The device of claim 3, wherein
the wall surface of the combustion chamber is an inner peripheral surface of a recessed cavity formed in a crown surface of the piston.

14. The device of claim 4, wherein
the wall surface of the combustion chamber is an inner peripheral surface of a recessed cavity formed in a crown surface of the piston.

15. The device of claim 5, wherein
the wall surface of the combustion chamber is an inner peripheral surface of a recessed cavity formed in a crown surface of the piston.

* * * * *